United States Patent [19]

Doessel

[11] Patent Number: 4,525,444
[45] Date of Patent: Jun. 25, 1985

[54] ELECTROPHOTOGRAPHIC RECORDING MATERIAL

[75] Inventor: Karl-Friedrich Doessel, Wiesbaden, Fed. Rep. of Germany

[73] Assignee: Hoechst Aktiengesellschaft, Frankfurt am Main, Fed. Rep. of Germany

[21] Appl. No.: 477,388

[22] Filed: Mar. 21, 1983

[30] Foreign Application Priority Data

Mar. 23, 1982 [DE] Fed. Rep. of Germany ....... 3210577

[51] Int. Cl.$^3$ .............................................. G03G 5/05
[52] U.S. Cl. ........................................ 430/96; 430/906
[58] Field of Search ............................ 430/96, 906, 284; 528/69, 391, 44

[56] References Cited

U.S. PATENT DOCUMENTS

| | | | |
|---|---|---|---|
| 3,159,483 | 12/1964 | Behmenburg et al. | 430/96 X |
| 3,403,019 | 9/1968 | Stahly et al. | 430/96 |
| 4,387,151 | 6/1983 | Bosse et al. | 430/906 X |

FOREIGN PATENT DOCUMENTS

| | | | |
|---|---|---|---|
| 24635 | 2/1979 | Japan | 430/96 |
| 22439 | 3/1981 | Japan | 430/96 |

*Primary Examiner*—John D. Welsh
*Attorney, Agent, or Firm*—Schwartz, Jeffery, Schwaab, Mack, Blumenthal & Evans

[57] ABSTRACT

An electrophotographic recording material is described for preparing a printing form or a printed circuit, comprising a layer support and a photoconductive layer comprised of photoconductor, sensitizer and/or activator, if appropriate further additives which improve surface texture and/or adhesion and a high molecular weight binder which is soluble in an alkaline aqueous or alcoholic solution and the photoconductive layer of which recording material contains as binder the product of reacting a sulfonyl isocyanate of the general formula $R-SO_2-NCO$ in which R is alkenyl having up to 4 carbon atoms or phenyl which can be substituted by alkyl having up to 3 carbon atoms, with a hydroxyl-containing polymer in a molar ratio within the range of (0.5 to 1):1.

9 Claims, No Drawings

ELECTROPHOTOGRAPHIC RECORDING MATERIAL

BACKGROUND OF THE INVENTION

The invention relates to an electrophotographic recording material for preparing a printing form or a printed circuit comprising a layer support and a photoconductive layer composed of photoconductor, sensitizer and/or activator, if appropriate further additives which improve surface texture and/or adhesion, and a high molecular weight binder which is soluble in an alkaline-aqueous or alcoholic solution.

It is known to use photoconductive layers of monomeric or polymeric organic photoconductors, sensitizers and/or activators and alkali-soluble binders on appropriate supports to prepare printing forms or printed circuits by electrophotographic means (German Pat. No. 1,117,391, which is equivalent to British Pat. No. 944,126). The photoconductive layers are applied to a suitable metallic or metallized support by suitable coating techniques from solution or by laminating, as disclosed in German Offenlegungsschrift No. 3,024,772. The high molecular weight binder contains alkali-solubilizing groups such as acid anhydride, carboxyl, phenol, sulfonic acid, sulfonamide or sulfonimide groups (German Pat. No. 2,322,047, equivalent to U.S. Pat. No. 4,066,453). Copolymers of styrene and maleic anhydride, phenolic resins or copolymers of styrene, methacrylic or acrylic acid and methacrylates are specifically mentioned for use as binders.

To prepare a printing form or a printed circuit, the electrophotographic recording material is electrostatically charged, exposed or imagewise electrostatically charged, and developed with a toner of a dry or liquid developer. The resulting toner image can be fixed by heating to 100° up to 250° C., and the layer is then decoated by treating it with an alkaline-aqueous or alcoholic solution, the treatment dissolving away those areas which are not covered by the toner. The final product is a planographic printing form or a mask for a printed circuit.

Film-forming acidic polymers are also known (U.S. Pat. No. 3,422,075) which are obtained by reacting a hydroxyl- or amino-containing polymer with a monosulfonyl isocyanate. They are soluble in alkali, and can be used as a film or sheet or as a coating material, in particular in place of resinous compounds containing carboxyl groups. Their use in the preparation of photographic layers is known.

It is also known (German Auslegeschrift No. 2,053,363, equivalent to U.S. Pat. No. 3,732,106) to use in mixtures for photopolymer layers a reaction product of a sulfonyl isocyanate and a vinyl alcohol polymer, epoxy resin having free OH groups, partial cellulose esters or ethers, polyamides or copolymers of these materials. The mixture can be used in the form of a solution or dispersion as a photoresist, which is applied to an individual support and exposed and developed after drying, for preparing printed circuits or it can be used in the form of a solid layer on a support as a light-sensitive material for preparing printing forms, in particular planographic printing plates.

A proposal also has been made for a light-curable mixture (German Offenlegungsschrift No. 3,036,077) which contains as the light-sensitive compound a diazonium salt polycondensation product or an organic azido compound, and as binder a high molecular weight polymer which has lateral sulfonylurethane groups and is soluble or at least swellable in aqueous-alkaline solutions, the polymer having lateral alkenylsulfonyl urethane or cycloalkenylsulfonyl urethane groups.

The disadvantage in preparing a printed circuit by electrophotographic means using known methods is that the layers containing the alkali-solubilizing binder can be applied or laminated to a copper-clad circuit board either not at all or only at relatively high temperatures. The high temperatures hinder the laminating process, and tend to damage the, usually, thermosensitive photoconductive substances, sensitizers and activators. As a result, the photoconductive layer loses some of its photosensitivity. A further disadvantage is that the layers which contain the known alkali-soluble binders and which are used for the electrophotographic process are no longer sufficiently flexible when about 30 $\mu m$ thick, which thickness is required for the manufacture of printed circuit boards. It is therefore necessary to handle these layers with extreme care, because even slight bending causes undesirable cracking, thereby rendering the layer unusable.

To prepare a form or a printed circuit by electrophotographic means, solvents must be added to the decoating solution to increase the rate of the process. After use, these solvent-containing decoating solutions pass into the effluent, where they are responsible for substantial pollution of the environment.

A further disadvantage of the known alkali-soluble binders is the impairment of electrophotographic sensitivity, in particular when the layers are thick.

SUMMARY OF THE INVENTION

It is therefore the object of the present invention to provide an electrophotographic recording material for preparing a printing form or a printed circuit, the photoconductive layer of which recording material can readily be laminated, is flexible, has good chargeability and yet offers high sensitivity even with relatively thick layers, and is readily and rapidly soluble in an aqueous-alkaline decoating solution which is as environmentally acceptable as possible.

This object is achieved by providing a recording material of the type mentioned at the outset, wherein the photoconductive layer contains, as binder, the product of reacting a sulfonyl isocyanate of the general formula $R-SO_2-NCO$ in which R denotes an alkenyl having up to 4 carbon atoms or phenyl which can be substituted by alkyl having up to 3 carbon atoms, with a hydroxyl-containing polymer in a molar ratio of $R-SO_2-NCO$ to $OH^-$ groups within a range from 0.5 to 1. In a preferred embodiment, the photoconductive layer contains as binder the product of reacting propenylsulfonyl isocyanate or p-toluenesulfonyl isocyanate with a vinyl alcohol copolymer.

DETAILED DESCRIPTION OF PREFERRED EMBODIMENTS

The binder according to the invention, which is a sulfonylurethane, has a softening point between 60° and 160° C. which depends on the hydroxyl component used. Because the preparation of the sulfonylurethane is an addition reaction and not a polymerization reaction, the molecular weight of the binder according to the invention is determined by the hydroxyl component used. If the viscosity of a 5% concentration solution of the hydroxyl component in n-butanol at 20° C. is taken as a measure of the molecular weight, a range between 10 and 300 mPa.s is possible. For preparing printing plates, compounds having a molecular weight of more than 50,000 are preferable, while the molecular weight will tend to be less than 50,000 when the compounds are used to prepare printed circuits.

The reactive hydroxyl group content in the binder according to the invention is more than about 3% and tpyically between 5 and 8%. If a polyvinyl acetal is used, the unconverted vinyl alcohol units content is between 10 and 30%.

To prepare the binder used according to the invention, the hydroxyl component to be converted is dissolved in a suitable solvent, such as tetrahydrofuran, and the sulfonyl isocyanate is added in pure form or in solution at room temperature. After the sulfonyl isocyanate has been added, it is observed that the mixture heats up to a small extent. The mixture is stirred for two hours, and the resulting solution of the sulfonylurethane is used without further purification or after the polymer has been precipitated in water.

The proportion of the binder according to the invention in the photoconductive layer is in general between 80 and 40% by weight; 65 to 55% by weight is preferably used.

The invention enables the provision of an electrophotographic recording material for a printing form or a printed circuit, which not only as a thin layer satiesfies highest demands, such as point-exact half-tone reproduction and long print run, but also as a relatively thick layer has advantages by virtue of its good flexibility and laminatability, the fact that it can be readily decoated, and the high sensitivity of photoconductive layers prepared therefrom.

It has been found, surprisingly, that the binder described, which is known as photocrosslinking when combined with photopolymers or diazo compounds, when combined with a photoconductive substance is suitable for use as a light-sensitive material for electrophotography when the molar ratio between sulfonyl isocyanate and the hydroxyl groups within a hydroxyl-containing polymer is between (0.5 to 1):1. Its good laminatability, hitherto unknown, has been discovered as a particular advantage, and enables the use of this material for preparing printed circuits.

In contrast to German Offenlegungsschrift No. 3,036,077, where the molar ratio between the hydroxyl-containing polymer and the sulfonyl isocyanate can be varied within a wide range, specific molar ratios between these two components must be maintained when used in electrophotography. For instance, the binders described there lead to electrophotographic layers having very low chargeability and very high conductivity in the dark or, when applied in 30 μm thick layers, show a very slow decoatability.

According to the invention, the molar ratio between hydroxyl-containing polymer and sulfonyl isocyanate is maintained in particular within the range of about 1:1 to 1:0.8. Recording materials which contain the binder in these ratios have not only good chargeability and low conductivity in the dark but also very good decoatability while retaining all other physical properties demanded.

Possible supports for the photoconductive layer in the preparation of a printing form are all materials known for this purpose, in particular mechanically or electrochemically surface-roughened anodized aluminum foils which may have been treated with polyvinyl phosphonic acid. Possible supports for the photoconductive layer in preparing printed circuits or chemically milled components are in particular copper-clad epoxy plates, copper-clad polyimide films or thin metal foils. The photoconductive layer also can have been applied to an intermediate support made of polyester or polypropylene film.

The photoconductors used for the photoconductive layer are known. Those suitable for this purpose are of the type described in German Pat. No. 1,120,875, equivalent to U.S. Pat. No. 2,257,203, in particular substituted vinyloxazoles, such as 2-vinyl-4-(2'-chlorophenyl)-5-(4''-diethylaminophenyl)-oxazole. Further examples of suitable photoconductors are triphenylamine derivatives, relatively highly condensed aromatic compounds, benzofused heterocyclic systems, pyrazoline derivatives and imidazole derivatives. This category also includes triazole derivatives and oxadiazole derivatives of the type disclosed in German Pat. No. 1,060,260, equivalent to U.S. Pat. No. 3,112,197, and in German Pat. No. 1,058,836, equivalent to U.S. Pat. No. 3,189,447. Of these, in particular, 2,5-bis-(4'-diethylaminophenyl)-1,3,4-oxadiazole is suitable.

In addition to these monomeric organic photoconductors there are also suitable polymeric photoconductors, such as polymerized heterocyclic vinyl compounds or those which consist of polymeric condensation products of formaldehyde and at least one polynuclear carbocyclic substituted aromatic compound (German Pat. No. 2,137,288, equivalent to U.S. Pat. No. 3,842,038). The molecular weight of these compounds should not exceed a value of M=500, because otherwise the decoatability becomes increasingly worse.

It is known to use sensitizers to widen the spectral sensitivity range. Effective sensitizers for example are the dyestuffs mentioned in Schultz's Dyestuff Tables, 7th Edition, 1st Volume, 1931: triarylmethane dyestuffs, such as Brilliant Green (No. 760, page 314), Victoria Blue B (No. 822, page 347), Methyl Violet (No. 783, page 327), Crystal Violet (No. 785, page 329), and Acid Violet 6B (No. 831, page 351); xanthene dyestuffs, and of these rhodamines, such as Rhodamine B (No. 854, page 365), Rhodamine 6G (No. 866, page 366), Rhodamine G extra (No. 865, page 366), Sulforhodamine B (No. 863, page 364), and Fast Acid Eosine G (No. 870, page 368), as well as phthaleins, such as Eosine S (No. 883, page 375), Eosine A (No. 881, page 374), Erytrosine (No. 886, page 376), Philoxine (No. 890, page 378), Bengal Rose (No. 889, page 378), and Fluoroescein (No. 880, page 373); thiazine dyestuffs, such as Methylene Blue (No. 1038, page 449); acridine dyestuffs, such as Acridine Yellow (No. 901, page 383), Acridine Orange (No. 908, page 387, and Trypaflavine (No. 906, page 386); quinoline dyestuffs, such as Pinacyanol (No. 924, page 396), and Crypotocyanine (No. 927, page 397); guinone and ketone dyestuffs, such as Alizarine (No. 1141, page 499), Alizarine Red S (No. 1145, page 502), and Quinizarine (No. 1148, page 504); and cyanine dyestuffs.

Many of these dyestuffs have, in the form in which they have been indicated, pre-exposure sensitivity, i.e., layers sensitized thereby can be charged to a markedly higher extent after storage for about 12 hours in the dark than after even brief exposure to light. To reduce or to avoid this undesirable property, it is possible to use a different dyestuff salt. For instance, the pre-exposure sensitivity described can be avoided in cationic dyestuffs, for example Rhodamine B, if the chloride anion is replaced by the perchlorate or the tetrafluoroborate anion, by reprecipitation. Further examples of anions are p-tosyl, hexafluorophosphate, and the like.

Further suitable dyestuffs are described, for example, in German Pat. No. 2,526,720, equivalent to U.S. Pat. No. 4,063,948. All dyestuffs can be used individually or mixed. It is also possible to use electron acceptors for the activation, as described for example in German Offenlegungsschrift No. 2,726,116. Suitable acceptors are nitrofluorenone, trinitrofluorenone, dicyanomethylenefluorene, dicyanomethylenedinitrofluorene, dicyanomethylenepolynitrofluorene and 3,6-dinitronaphthalene-1,8-dicarboxylic anhydride.

Furthermore, it is possible to use disperse photoconductive dyestuff pigments for the sensitization, as described, for example, in German Offenlegungsschrift No. 2,108,939, equivalent to U.S. Pat. No. 3,870,516. It is also possible to use inorganic photoconductors, such as glassy selenium, selenium alloys, cadmium sulfide sulfoselenide, zinc oxide or the X-form of metal-free phthalocyanine and other dyestuff pigments, for example perylene pigments, such as N,N'-dimethylperyl diimide. These disperse dyestuff pigments are preferably used in a concentration of 0.5 to 2% by weight, and lead to pre-exposure-insensitive photoconductive layers.

The examples which follow illustrate the invention in more detail.

Preparation of the binder according to the invention:
1. Sulfonylurethane with propenylsulfonyl isocyanate
   30 g of polyvinyl butyral containing 18–21 percent by weight of free vinyl alcohol groups were dissolved in
   190 g of anhydrous tetrahydrofuran, and
   180 g of propenylsulfonyl isocyanate were added dropwise with stirring. The sulfonylurethane (solution 1, about 20% concentration) was formed in an exothermic reaction.
2. Sulfonylurethane with propenylsulfonyl isocyanate
   30 g of polyvinyl butyral containing 24–27 percent by weight of free vinyl alcohol groups were dissolved in
   210 g of anhydrous tetrahydrofuran, and
   23 g of propenylsulfonyl isocyanate were added dropwise with stirring. The sulfonylurethane (solution 2, about 20% concentration) was formed in an exothermic reaction.
3. Sulfonylurethane with p-toluenesulfonyl isocyanate
   30 g of polyvinyl butyral containing 18–21 percent by weight of free vinyl alcohol groups were dissolved in
   220 g of anhydrous tetrahydrofuran, and
   24 g of p-toluenesulfonyl isocyanate were added dropwise with stirring. The sulfonylurethane (Solution 3, about 20% concentration) were formed in an exothermic reaction.
4. Sulfonylurethane with propenylsulfonyl isocyanate
   25 g of a low molecular weight branched polyester having a hydroxyl group content of 8% by weight, and
   5 g of a low molecular weight polyacrylate having a hydroxyl group content of 4.2% by weight were dissolved in
   190 g of anhydrous tetrahydrofuran, and
   20 g of propenylsulfonyl isocyanate were added dropwise with stirring. The sulfonylurethane (Solution 5, about 20% concentration) was formed in an exothermic reaction.
5. Sulfonylurethane with propenylsulfonyl isocyanate
   30 g of cellulose acetopropionate containing 2.5% by weight of acetyl, 40% by weight of propionate and 5.5% by weight of hydroxyl groups were dissolved in
   200 g of anhydrous tetrahydrofuran, and
   20 g of propenylsulfonyl isocyanate were added dropwise with stirring. The sulfonylurethane (Solution 4, about 20% concentration) was formed in an exothermic reaction.

EXAMPLE 1

40 g of 2,5-bis-(4'-diethylaminophenyl)-1,3,4-oxadiazole were dissolved in
300 g of solution 1.
100 g of N,N'-dimethylperyldiimide was ball-milled together with this solution at room temperature for 3 hours.

The dispersion was coated onto a 50 μm thick polyethylene terephthalate film serving as an intermediate support in a layer 30 μm thick when dry. The layer was very flexible and could be bent, without showing cracks, around a cylinder of 1 cm radius. To prepare a printed circuit, the material was transferred by laminating at a temperature of 95° C. from the intermediate support to a copper-clad epoxy board. The electrophotographic recording material thus obtained was not pre-exposure-sensitive, and could be used immediately without prior storage in the dark. It was possible, with equal success, to provide the material not only with a positive but also with a negative charge. After having been given a negative charge in the dark, the photoconductive layer, which was very light-sensitive despite the substantial thickness, was subjected to imagewise exposure and treated with a toner, and the toner, which had become deposited in the form of an image, was fixed by thermal irradiation. In a subsequent process step, those parts of the photoconductive layer which were not covered by toner were dissolved away down to the copper layer by treatment with a commercially available aqueous alkaline decoating solution which contained wetting agent. This decoating took place particularly readily with the binder according to the invention, and made high resolution possible and hence a high packing density of the conductive paths. The further process steps (electroplating, tin-plating, stripping, etching) were carried out in the manner customary in printed circuit board technology, and produced a high-quality printed circuit board.

EXAMPLE 2 (COMPARATIVE EXAMPLE)

60 g of a copolymer of styrene and maleic anhydride, and
40 g of 2,5-bis-(4'-diethylaminophenyl)-1,3,4-oxadiazole were dissolved in
260 g of tetrahydrofuran.
1 g of N,N'-dimethylperylimide was ball-milled together with this solution at room temperature for 3 hours.

The dispersion was coated onto a 50 μm thick polyethylene terephthalate film serving as an intermediate support in a layer 30 μm thick when dry. The layer was very little and had marked cracks even upon slight flexing of the support film. Upon folding the layer around a cylinder having a 15 cm radius, the layer began to spall. The photoconductive layer was not laminatable. The material was unusable as a circuit board resist.

EXAMPLE 3 (COMPARATIVE EXAMPLE)

60 g of a terpolymer of 30% of methacrylic acid, 10% of styrene and 60% of methacrylate, as used in commercially available photopolymer resist, and
40 g of 2,5-bis-(4'-diethylaminophenyl)-1,3,4-oxadiazole were dissolved in
260 g of tetrahydrofuran.
1 g of N,N'-dimethylperylenetetradicarboximide was milled together with this solution at room temperature for 3 hours.

The dispersion was coated onto a 50 μm thick polyethylene terephthalate film serving as an intermediate support in a layer 30 μm thick when dry. The layer was found to be very brittle, and began to spall from the carrier film even during drying. The material is unusable as a flexible electrophotographic circuit board resist.

EXAMPLE 4 (COMPARATIVE EXAMPLE)

Example 1 were repeated, except that in accordance with Example 2 of German Offenlegungsschrift No. 3,036,077, the solution of a sulfonylurethane with an excess of propenylsulfonyl isocyanate was used in place of solution 1.
30 g of polyvinyl butyral containing 18–21 percent by weight of vinyl alcohol groups were dissolved in
200 g of anhydrous tetrahydrofuran, and
24.3 g of propenylsulfonyl isocyanate were added dropwise with stirring.

The solution, which can be readily used for preparing a photocrosslinking diazo printing plate, produced an electrophotographic layer having very low chargeability. The layer was unsuitable for electrophotographic purposes.

EXAMPLE 5 (COMPARATIVE EXAMPLE)

Example 1 was followed, except that in accordance with Example 4 of German Offenlegungsschrift No. 3,036,077, the solution of a sulfonylurethane in which only 20% of the reactive hydroxyl groups had been reacted with propenylsulfonyl isocyanate was used in place of Solution 1.
30 g of polyvinyl butyral containing 27 percent by weight of vinyl alcohol groups were dissolved in
140 g of anhydrous tetrahydrofuran, and
5.4 g propenylsulfonyl isocyanate were added dropwise with stirring.

While the electrophotographic properties of the layer prepared from this solution was very good, a 30 μm thick layer could not be delaminated within 5 minutes by means of an aqueous alkaline delaminator which contained wetting agent.

EXAMPLE 6

Example 1 was repeated, except that Solution 1 was replaced by the same amount of Solution 2. The results were equally as good.

EXAMPLE 7

Example 1 was repeated, except that Solution 3 was used in place of Solution 1. The results were as good except for a somewhat slower decoatability.

EXAMPLE 8

Example 1 was repeated, except that Solution 4 was used in place of Solution 1. The results were equally as good.

EXAMPLE 9

Example 1 was repeated, except that the N,N'-dimethylperylimide dyestuff pigment was replaced by a red condensation product of benzothioxanthene-3,4-dicarboxylic anhydride and nitro-substituted o-phenylenediamine, in accordance with German Offenlegungsschrift No. 2,355,075 (equivalent to U.S. Pat. No. 4,028,102).

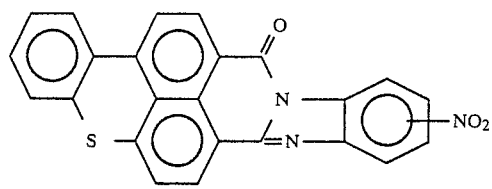

The results were equally as good.

EXAMPLE 10

0.3 g of Rhodamine B Perchlorate were dissolved in
30 g of methanol, and the solution was added to a solution of
300 g of Solution 1 in which
40 g of 2,5-bis-(4'-diethylaminophenyl)-1,3,4-oxadiazole had been dissolved.

The colored solution was coated onto a 50 μm thick polyethylene terephthalate film serving as an intermediate support in a layer 30 μm thick when dry. The properties were as good as in Example 1.

EXAMPLE 11

1 g of Astrazone Orange R (C.I. 48 040) were dissolved in
100 g of methanol, and the solution was added to a solution of
40 g of 2,5-bis-(4'-diethylaminophenyl)-1,3,4-oxadiazole in
300 g of Solution 1.

The colored solution was coated onto a 50 μm thick polyethylene terephthalate film serving as an intermediate support in a layer 30 μm thick when dry. The layer had the same good flexibility and laminatability as the layer of Example 1. The recording material obtained was preexposure-sensitive, and had to be stored in the dark for 12 hours before further use. It was then possible to use it in the manner described for preparing a printed circuit.

EXAMPLE 12

1.0 g of Astrazone Orange R (C.I. 48 040) and
0.3 g of Rhodamine B were dissolved in
13 g of methanol, and the solution was added to a solution of
45 g of 2,5-bis-(4'-diethylaminophenyl)-1,3,4-oxadiazole and
10 g of a commercially available polyvinyl methyl ether (LUTONAL®M 40) in
225 g of Solution 1.

This gave a recording material which is highly photosensitive in the blue and green spectral region but nevertheless can be processed under red light. The polyvinyl methyl ether content ensured a particularly good degree of flexibility.

The solution was coated onto a 50 μm thick polyethylene terephthalate film serving as an intermediate support in a layer which had a weight of 25 g/m² when dry. The material was transferred by laminating at a temperature of 120° C. from the intermediate support to a copper-clad board, and the sensitivity of this layer was measured as described in Example 13 below.

EXAMPLE 13 (COMPARATIVE EXAMPLE)

Example 12 was followed except that Solution 1 was replaced by a corresponding amount of a copolymer of 44 mole percent of n-hexyl methacrylate, 12 mole percent of styrene, 19 mole percent of methacrylic acid, and 25 mole percent of acrylic acid. The photosensitivity of the photoconductive layers prepared was measured as follows:

To determine the discharge curves under light the specimen was moved by a rotating plate through a charging-up device to an exposure station, where it was continuously exposed with an XBO 150 xenon lamp from Messrs. Osram. A KG 3 thermal absorption glass from Messrs. Schott & Gen., Mainz, and a neutral filter of 15 percent transparency had been mounted in front of the lamp. The intensity of the light in the measuring plane was within a range of 70 to 170 $\mu W/cm^2$; it was measured with an $-80$ X optometer (United Detector Technology, Inc.) immediately after the decay curve under light had been determined. The charging level ($U_o$) and the photoinduced decay curve under light were measured via a 610 CR electrometer from Messrs. Keithley Instruments, USA, on an oscilloscope by means of a transparent probe. The photoconductive layer was characterized by the charging level in Volts ($U_o$) and the time ($T_{\frac{1}{2}}$) after which half the charge ($U_{o/2}$) had been reached. The product of $T_{\frac{1}{2}}$ and the measured light intensity I ($\mu W/cm^2$) is the half-life energy, $E_{\frac{1}{2}}$ ($\mu J/cm^2$).

The photosensitivity of the layers was determined by the method of characterization described:

|  | + $U_o$ (V) | $E_{\frac{1}{2}}$ ($\mu J/cm^2$) |
|---|---|---|
| Material of Example 12 | 720 | 52 |
|  | 690 | 30 |

The binder according to the invention obviously supports charge transport through the layers, and thus makes possible electrophotographic layers which are highly light-sensitive in spite of being very thick.

EXAMPLE 14

Example 10 was repeated, except that Rhodamine B Perchlorate was replaced by the same amount of Brilliant Green Fluoroborate. This produced a recording material which can be exposed by means of a low-power He/Ne laser.

EXAMPLE 15

The materials of Example 1 were used, except that coating took place onto an anodized aluminum support, which had been pretreated with polyvinylphosphonic acid and was suitable for use as a printing form, in a layer 3 $\mu$m thick when dry. The material was charged up in the dark to +400 V, subjected to imagewise exposure, and treated with a toner, and the toner was fixed in the image areas by thermal irradiation. In spite of the thin layer, a high-contrast, well covering toner image was obtained. In the subsequent process step, those parts of the photoconductive layer which had not been covered by toner were completely dissolved away by treatment with an aqueous-alkaline decoating solution which containing wetting agent. This decoating proceeds particularly readily with the binder according to the invention, and makes high resolution possible.

EXAMPLE 16

40 g of 2,5-bis-(4'-diethylaminophenyl)-1,3,4-oxadiazole were dissolved in
300 g of Solution 5.
1 g of N,N'-dimethylperylimide were milled together with this solution at room temperature for 3 hours.

The coating onto a printing plate support and the processing were carried out as the Example 15. The results are equally as good.

EXAMPLE 17

The materials of Example 10 were used, except that coating took place onto a form made of 300 $\mu$m thick aluminum in a layer 3 $\mu$m thick when dry. The results were as good as in Example 15.

EXAMPLE 18

The materials of Example 11 were used, except that coating took place onto an aluminum form in a layer 3 $\mu$m thick when dry. The results were as good as in Example 15.

EXAMPLE 19

The materials of Example 12 were used, except that coating took place onto a roughened aluminum foil in a layer 3 $\mu$m thick when dry. The results were as good as in Example 15.

EXAMPLE 20

The materials of Example 14 were used, except that coating took place onto an electrolytically roughened 300 $\mu$m thick aluminum film in a layer 3 $\mu$m thick when dry. The results were as good as in Example 15.

EXAMPLE 21

The materials of Example 1 were used, except that the solution was applied as a photoresist by spin-coating onto a copper-clad circuit board in a layer (dry) of 30 $\mu$m. The board was pre-dried in air for 1 hour and then after-dried at 110° C. for 5 minutes. Further processing took place as described in Example 1. The results were as good as in Example 1.

It will be obvious to those skilled in the art that many modifications may be made within the scope of the present invention without departing from the spirit thereof, and the invention includes all such modifications.

What I claim is:

1. An electrophotographic recording material for preparing a printing form or a printed circuit, comprising a layer support and a photoconductive layer comprising a photoconductor, a sensitizer, and/or an activator, wherein said photoconductive layer further comprises a high molecular weight binder which is soluble in an alkaline-aqueous or alcoholic solution, said binder comprising the product of reacting a sulfonyl isocyanate of the formula

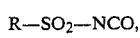

in which R is alkenyl having up to 4 carbon atoms, or phenyl which can be substituted by alkyl having up to 3 carbon atoms, with a hydroxyl-containing polymer in a molar ratio within the range of (0.5 to 1):1.

2. A recording material as claimed in claim 1, wherein said hydroxyl-containing polymer comprises at least one selected from the group consisting of a vinyl alcohol copolymer, a cellulose ester, and a polyester.

3. A recording material as claimed in claim 1, wherein said hydroxyl-containing polymer comprises a polyvinyl butyral having unconverted vinyl alcohol units.

4. A recording material as claimed in claim 1, wherein R is a propenyl or tolyl group.

5. A recording material according to claim 1, wherein the photoconductive layer contains as binder the product of reacting propenylsulfonyl isocyanate or p-toluenesulfonyl isocyanate with a vinyl alcohol copolymer.

6. A recording material as claimed in claim 1, wherein said molar ratio of said sulfonyl isocyanate to said hydroxyl-containing polymer is within the range of (0.8 to 1):1.

7. A recording material as claimed in claim 1, wherein the photoconductive layer contains, as sensitizer, a dissolved dyestuff.

8. A recording material as claimed in claim 7, wherein the photoconductive layer contains, as sensitizer, a perchlorate, a fluoroborate, a fluorophosphate, or a p-toluenesulfonic acid salt of a cationic dyestuff.

9. A recording material as claimed in claim 1, wherein the photoconductive layer contains a dyestuff pigment in the form of a dispersion.

* * * * *